United States Patent
Song et al.

(10) Patent No.: US 12,422,705 B2
(45) Date of Patent: Sep. 23, 2025

(54) DISPLAY APPARATUS HAVING A VIEWING ANGLE CONTROL UNIT

(71) Applicant: LG Display Co., Ltd., Seoul (KR)

(72) Inventors: Jae Hong Song, Paju-si (KR); Kyu Hyun Seo, Paju-si (KR); Sung Gu Kang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/521,586

(22) Filed: Nov. 28, 2023

(65) Prior Publication Data

US 2024/0255787 A1 Aug. 1, 2024

(30) Foreign Application Priority Data

Feb. 1, 2023 (KR) ........................ 10-2023-0013432

(51) Int. Cl.
*G02F 1/13* (2006.01)
*G02F 1/13357* (2006.01)
*G02F 1/1343* (2006.01)

(52) U.S. Cl.
CPC ........ *G02F 1/1323* (2013.01); *G02F 1/13362* (2013.01); *G02F 1/134309* (2013.01)

(58) Field of Classification Search
CPC .............. G02F 1/1323; G02F 1/13362; G02F 1/134309; G02F 1/133528; G02F 1/1337; G02F 1/133615; G02F 1/137
See application file for complete search history.

(56) References Cited

U.S. PATENT DOCUMENTS

| | | | |
|---|---|---|---|
| 2023/0296932 A1* | 9/2023 | Murata | G02F 1/134372 349/56 |
| 2024/0069370 A1* | 2/2024 | Zhou | G02F 1/133531 |
| 2024/0160052 A1* | 5/2024 | Murata | G02F 1/13471 |

FOREIGN PATENT DOCUMENTS

KR 10-0828696 B1 5/2008

* cited by examiner

*Primary Examiner* — Mariam Qureshi (74) *Attorney, Agent, or Firm* — Fenwick & West LLP (57) ABSTRACT

A display apparatus having a viewing angle control unit is provided. The viewing angle control unit may be disposed between a back-light unit and a liquid crystal panel. The viewing angle control unit may include a control liquid crystal layer disposed between a lower electrode and an upper electrode. The viewing angle control unit may be switched to a wide viewing angle mode or a narrow viewing angle mode according to voltage applied to the lower electrode and the upper electrode. In the narrow viewing angle mode, each liquid crystal particle of the control liquid crystal layer may be obliquely arranged with respect to the lower electrode and the upper electrode. Thus, an image provided by the display apparatus may be not recognized to peoples around a user, selectively.

11 Claims, 10 Drawing Sheets

DISPLAY APPARATUS HAVING A VIEWING ANGLE CONTROL UNIT

CROSS-REFERENCE TO RELATED APPLICATION

This application claims the benefit of Republic of Korea Patent Application No. 10-2023-0013432, filed on Feb. 1, 2023, which is hereby incorporated by reference in its entirety.

BACKGROUND

Field

The present disclosure relates to a display apparatus including a viewing angle control unit configured to limit a path of travel of light.

Discussion of the Related Art

Generally, a display apparatus provides an image. For example, the display apparatus may include a liquid crystal panel on a back-light unit. The liquid crystal panel may realize a specific image using light provided to the back-light unit. For example, the liquid crystal panel may include a display liquid crystal layer between a first display substrate and a second display substrate.

The display apparatus may be installed in various places. For example, the display apparatus may be mounted inside in front of a passenger seat of a car. The image realized by the display apparatus may be displayed to people around a user, for example, a driver sitting in a driver seat. Thus, the image displayed by the display apparatus may be dispersed to eyes of people around the user, for example, the driver. Thus, in a place where the display apparatus is used, accidents may occur due to gaze of dispersion of people around the user, for example, the driver.

SUMMARY

Accordingly, the present disclosure is directed to a display apparatus that substantially obviates one or more problems due to limitations and disadvantages of the related art.

An object of the present disclosure is to provide a display apparatus capable of preventing accidents due to gaze dispersion of people around a user.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In one embodiment, a display apparatus comprises: a back-light unit; a viewing angle control unit on the back-light unit, the viewing angle control unit including a first lower electrode, a first control liquid crystal layer on the first lower electrode that includes a plurality of first liquid crystal particles, and a first upper electrode on the first control liquid crystal layer; and a liquid crystal panel configured to display an image, the liquid crystal panel on the first upper electrode of the viewing angle control unit and including a display liquid crystal layer, wherein the viewing angle control unit is configured to switch between a wide viewing angle mode corresponding to a first viewing angle and a narrow viewing angle mode corresponding to a second viewing angle that is less than the first viewing angle according to a voltage applied to the first lower electrode and the first upper electrode, and wherein in the narrow viewing angle mode, each of the plurality of first liquid crystal particles of the first control liquid crystal layer is obliquely arranged with respect to the first lower electrode and the first upper electrode.

In one embodiment, a display apparatus comprises: a back-light unit configured to emit light; a liquid crystal panel configured to display an image, the liquid crystal panel including a display liquid crystal layer; and a first viewing angle control unit between the back-light unit and the liquid crystal panel such that the first viewing angle control unit overlaps the liquid crystal panel, the first viewing angle control unit including a first lower electrode, a first control liquid crystal layer on the first lower electrode that includes a plurality of first liquid crystal particles, and a first upper electrode on the first control liquid crystal layer, wherein the first viewing angle control unit is configured to provide the light emitted by the back-light unit to the liquid crystal panel at a first viewing angle during a first mode and provide the light emitted by the back-light unit to the liquid crystal panel at a second viewing angle that is less than the first viewing angle during a second mode.

In one embodiment, a display apparatus in a vehicle comprises: a back-light unit configured to emit light; a liquid crystal panel configured to display an image in a display area, the liquid crystal panel including a display liquid crystal layer; and a first viewing angle control unit between the back-light unit and the liquid crystal panel, the first viewing angle control unit including a first lower electrode, a first control liquid crystal layer on the first lower electrode that includes a plurality of first liquid crystal particles, and a first upper electrode on the first control liquid crystal layer, wherein the first viewing angle control unit is configured to switch between a wide viewing angle mode corresponding to a first viewing angle and a narrow viewing angle mode corresponding to a second viewing angle that is less than the first viewing angle according to a voltage applied to the first lower electrode and the first upper electrode, wherein during the wide viewing angle mode both a driver and a passenger of the vehicle view the image displayed in the display area and during a narrow viewing angle mode the passenger of the vehicle views the image displayed in the display area without the driver of the vehicle being able to view the image displayed in the display area.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Hereinafter, details related to the above objects, technical configurations, and operational effects of the embodiments of the present disclosure will be clearly understood by the following detailed description with reference to the drawings, which illustrate some embodiments of the present disclosure. Here, the embodiments of the present disclosure are provided in order to allow the technical sprit of the present disclosure to be satisfactorily transferred to those skilled in the art, and thus the present disclosure may be embodied in other forms and is not limited to the embodiments described below.

In addition, the same or extremely similar elements may be designated by the same reference numerals throughout the specification and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the first element and the second element may be arbitrary named according to the convenience of those skilled in the art without departing the technical sprit of the present disclosure.

The terms used in the specification of the present disclosure are merely used in order to describe particular embodiments, and are not intended to limit the scope of the present disclosure. For example, an element described in the singular form is intended to include a plurality of elements unless the context clearly indicates otherwise. In addition, in the specification of the present disclosure, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

And, unless 'directly' is used, the terms "connected" and "coupled" may include that two components are "connected" or "coupled" through one or more other components located between the two components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Embodiment

Figure 1:
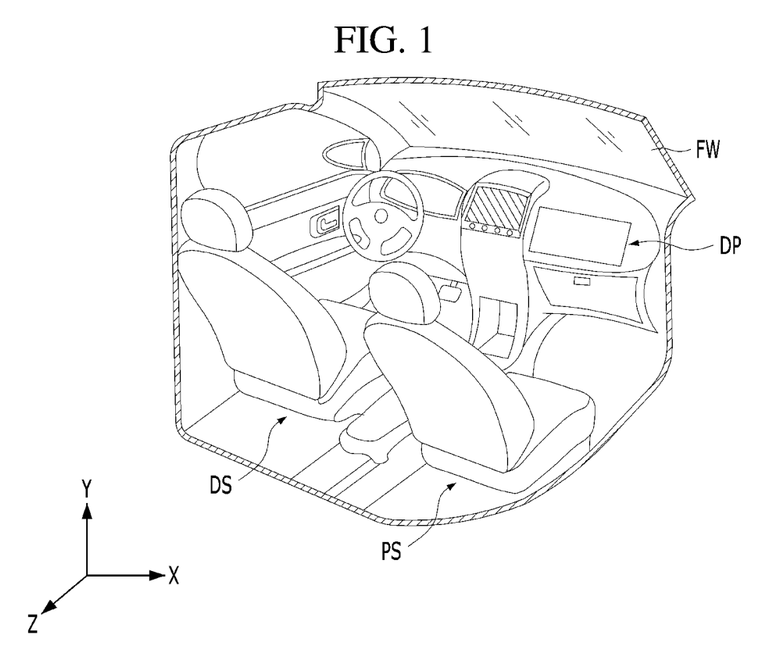
FIG. 1 is a view showing a place in which a display apparatus according to an embodiment of the present disclosure is installed.
Figure 2:
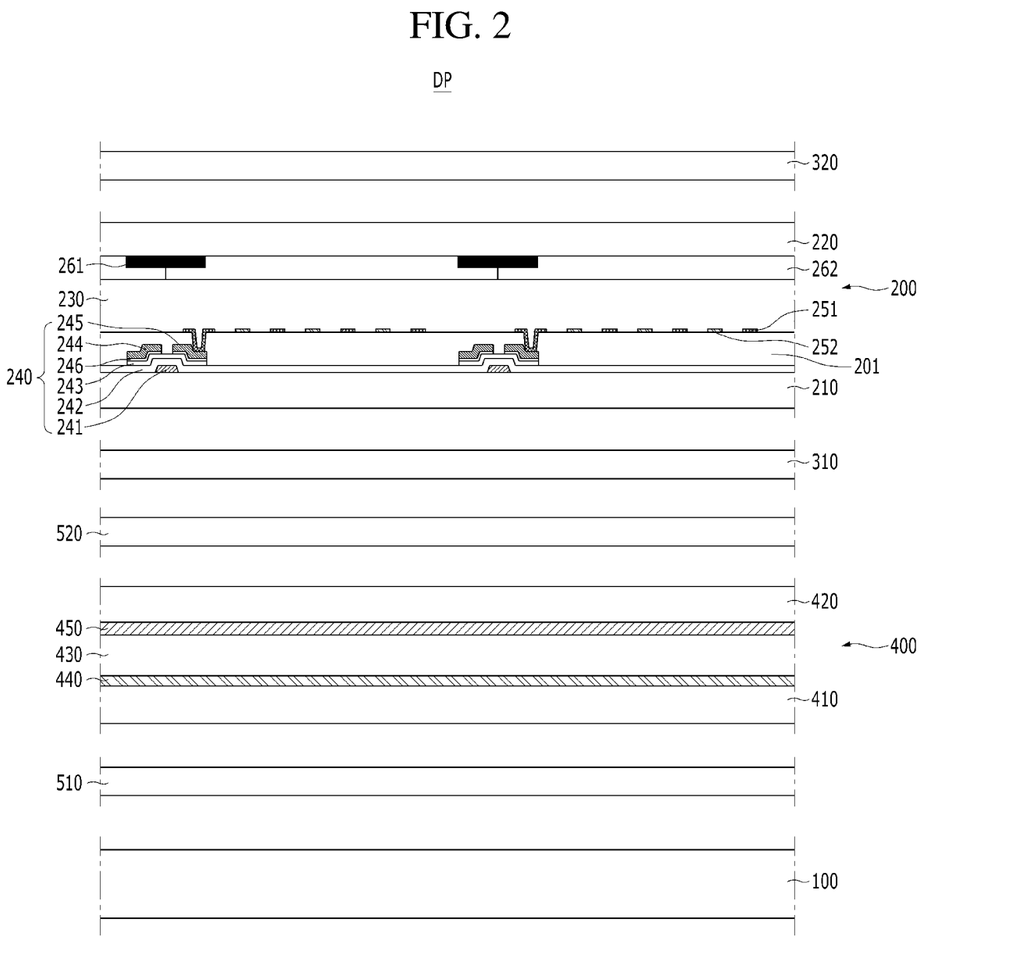
FIG. 2 is a view schematically showing the display apparatus according to the embodiment of the present disclosure.
Figure 3:
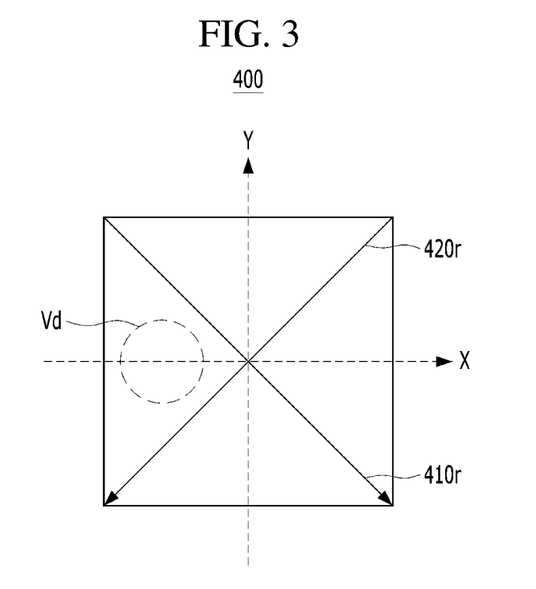
FIG. 3 is a view showing a top surface of a viewing angle control unit in the display apparatus according to the embodiment of the present disclosure.

FIG. 1 is a view showing a place in which a display apparatus according to an embodiment of the present disclosure is installed. FIG. 2 is a view schematically showing the display apparatus according to the embodiment of the present disclosure. FIG. 3 is a view showing a top surface of a viewing angle control unit in the display apparatus according to the embodiment of the present disclosure.

Referring to FIGS. 1 to 3, the display apparatus DP according to the embodiment of the present disclosure may installed in front of a passenger seat PS of a car (e.g., a vehicle). For example, an image realized by the display apparatus DP according to the embodiment of the present disclosure may be recognized to driver sitting in a driver seat DS, which is disposed side by side in a first direction with the passenger seat PS. That is, the image realized by the display apparatus DP according to the embodiment of the present disclosure may disperse to the eyes of the driver. In the display apparatus DP according to the embodiment of the present disclosure, a viewing angle may be selectively limited. For example, in the display apparatus DP according to the embodiment of the present disclosure, the viewing angle may be limited while the driver drives the car to prevent the image from being displayed to the driver. Thus, in the display apparatus DP according to the embodiment of the present disclosure, accidents due to gaze dispersion of the driver may be prevented while the driver drives the car. That is, the display apparatus DP reduces accidents due to preventing the driver from viewing the image displayed by the display apparatus DP while the driver is driving the car. In one embodiment, the display apparatus DP may include a viewing angle control unit 400 between the back-light unit 100 and the liquid crystal panel 200 such that the viewing angle control unit 400 overlaps the liquid crystal panel 200. In one embodiment, the viewing angle control unit 400 controls the viewing angle of the image displayed by the display apparatus DP. For example, during a wide viewing angle mode both a driver and a passenger of the vehicle view the image displayed in a display area of the display apparatus DP and during a narrow viewing angle mode the passenger of the vehicle views the image displayed in the display area without the driver of the vehicle being able to view the image displayed in the display area.

The back-light unit 100 is configured to provide light to the liquid crystal panel 200. For example, the back-light unit 100 may include a light-source device and a light-guide plate. The light-source device may emit light. The light emitted from the light-source device may travel toward the liquid crystal panel 200 through the light-guide plate. For example, the light-source device may be disposed on a side of the light-guide plate. The light incident from the light-source device may be emitted through an upper surface of the light-guide plate. For example, the light-guide plate may function as a surface light source. The liquid crystal panel 200 may be disposed on the upper surface of the light-guide plate. Herein, the upper surface of the light-guide plate may be a plane made of the first direction X and a second direction Y perpendicular to the first direction X. For example, the second direction Y may be a direction of a front window FW of the car in which the display apparatus DP is installed. A reflection plate may be disposed on a lower surface of the light-guide plate.

The liquid crystal panel 200 may be disposed on the back-light unit 100. For example, the back-light unit 100 and the liquid crystal panel 200 may be disposed side by side a third direction perpendicular to the first direction X and the second direction Y. Herein, the third direction Z may be a direction of the user sitting in the passenger seat PS. The liquid crystal panel 200 may realize (e.g., display) the image provided to the user using the light provided from the back-light unit 100. For example, the liquid crystal panel 200 may include a display crystal layer 230 disposed between a first display substrate 210 and a second display substrate 220. A transmittance of the display liquid crystal layer 230 may vary according to a horizontal electric field formed between the first display substrate 210 and the second display substrate 220. For example, the display liquid crystal layer 230 may include liquid crystal particles of IPS mode.

Pixel electrodes 251 and a common electrode 252 may be disposed side by side between the first display substrate 210 and the display liquid crystal layer 230 of the liquid crystal panel 200. A black matrix 261 and color filters 262 may be disposed side by side between the display liquid crystal layer 230 and the second display substrate 220 of the liquid crystal panel 200. The black matrix 261 may be a mesh shape. For example, the black matrix 261 may define pixel areas. The color filters 262 may be disposed in the pixel areas defined by the black matrix 261. For example, each of the color filter 262 may overlap one of the pixel areas. At least portion of one of the pixel electrode 251 and at least portion of the common electrode 252 may be disposed in each pixel area. For example, each pixel area of the liquid crystal panel 200 may have a transmittance according to a horizontal electric field formed between the corresponding pixel electrode 251 and the common electrode 252.

The transmittance of each pixel area may be controlled, independently. For example, a plurality of thin film transistors 240 and an over-coat layer may be disposed between the first display substrate 210 and the display liquid crystal layer 230. The over-coat layer 201 may cover the plurality of the thin film transistors 240. For example, a thickness difference due to the plurality of the thin film transistors 240 may be removed by the over-coat layer. The pixel electrodes 251 and the common electrode 252 may be disposed side by side between the over-coat layer and the display liquid crystal layer 230. The plurality of the thin film transistors 240 may overlap the black matrix 261. Thus, in the display apparatus DP according to the embodiment of the present disclosure, the plurality of the thin film transistors 240 may be not recognized to the user. Therefore, in the display apparatus DP according to the embodiment of the present disclosure, decrease in a quality of the image due to the plurality of the thin film transistors 240 may be prevented.

The plurality of the thin film transistors 240 may configure a plurality of pixel driving circuits. For example, each of the pixel driving circuits may include at least one of the thin film transistors 240. Each of the pixel electrodes 251 may be electrically connected to a corresponding one of the pixel driving circuits. Each of the pixel driving circuits may generate a driving current corresponding to a data signal according to a gate signal. For example, each of the thin film transistors 240 may include a gate electrode 241, a gate insulating layer 242, an active pattern 243, a source electrode 244, a drain electrode 245, and an ohmic contact layer 246.

The gate electrode 241 may be disposed on the first display substrate 210. The gate insulating layer 242 may be disposed between the gate electrode 241 and the active pattern 243. The active pattern 243 may be insulated from the gate electrode 241 by the gate insulating layer 242. The gate insulating layer 242 may extend beyond the active pattern 243. For example, the gate insulating layer 242 of each thin film transistor 240 may extend along a surface of the first display substrate 210. The source electrode 244 and the drain electrode 245 may be disposed on the active pattern 243. The drain electrode 245 may be spaced apart from the source electrode 244. A portion of the active pattern 243 disposed between the source electrode 244 and the drain electrode 245 may function as a channel region. The ohmic contact layer 246 may be disposed between the active pattern 243 and the source electrode 244 and between the active pattern 243 and the drain electrode 245. A resistance between the active pattern 243 and the source electrode 244 and a resistance between the active pattern 243 and the drain electrode 245 may be reduced by the ohmic contact layer 246. Each of the pixel electrodes 251 may be electrically connected to the drain electrode 245 of one of the thin film transistors 240.

The liquid crystal panel 200 may be disposed between a first display polarizer 310 and a second display polarizer 320. The first display polarizer 310 and the second display polarizer 320 may be a linear polarizer. An absorption axis of the second display polarizer 320 may be perpendicular to an absorption axis of the first display polarizer 310.

The viewing angle control unit 400 is configured to selectively limit the viewing angle of the light provided to the liquid crystal panel 200 from the back-light unit 100. For example, the viewing angle control unit 400 may be disposed between the light-guide plate of the back-light unit 100 and the first display polarizer 310. The viewing angle control unit 400 may include a control liquid crystal layer 430 between a lower substrate 410 and an upper substrate 420. The lower substrate 410 may be disposed close to the back-light unit 100. The upper substrate 420 may be disposed close to the liquid crystal panel 200. The lower substrate 410 and the upper substrate 420 may include an insulating material. The lower substrate 410 and the upper substrate 420 may include a transparent material. For example, the lower substrate 410 and the upper substrate 420 may include glass or plastic. The upper substrate 420 may include a material different from the lower substrate 410.

The control liquid crystal layer 430 may include a plurality of liquid crystal particles having a different mode from the display liquid crystal layer 230. That is, the liquid crystal particles included in the control liquid crystal layer 430 are independently controlled from the liquid crystal particles included in the display liquid crystal layer 230. Thus, the liquid crystal particles included in the control liquid crystal layer 430 can be oriented at different angles from the liquid crystal particles included in the display liquid crystal layer 230. A transmittance of the control liquid crystal layer 430 may vary according to a vertical electric field formed between the lower substrate 410 and the upper substrate 420. For example, the control liquid crystal layer 430 may include the liquid crystal particles of TN mode. A lower electrode layer 440 may be disposed between the lower substrate 410 and the control liquid crystal layer 430 of the viewing angle control unit 400. An upper electrode layer 450 may be disposed between the control liquid crystal layer 430 and the upper substrate 420 of the viewing angle control unit 400. The lower electrode layer 440 and the upper electrode layer 450 may include a conductive material. The lower electrode layer 440 and the upper electrode layer 450 may include a transparent material. For example, the lower electrode layer 440 and the upper electrode layer 450 may be a transparent electrode made of a transparent conductive material, such as ITO and IZO. The upper electrode layer 450 may include a material different from the lower electrode layer 440.

Each of the liquid crystal particles of the control liquid crystal layer 430 on a lower surface of the upper electrode layer 450 (e.g., first portion of liquid crystal particles) toward the control liquid crystal layer 430 may be oriented in a direction different from each of the liquid crystal particles of the control liquid crystal layer 430 on an upper surface of the lower electrode layer 440 (e.g., second portion of liquid crystal particles) toward the control liquid crystal layer 430. For example, each of the liquid crystal particles of the control liquid crystal layer 430 on the upper surface of the lower electrode layer 440 may be oriented in a first orientation direction 410r, and each of the liquid crystal particles of the control liquid crystal layer 430 on the lower surface of the upper electrode layer 450 may be oriented in a second orientation direction 420r perpendicular to the first orientation direction 410r. The first orientation direction 410r and the second orientation direction 420r may be different from the first direction X and the second direction Y. For example, the first orientation direction 410r may be a direction inclined at 45° or −135° with respect to the first direction X, and the second orientation direction 420r may be a direction inclined at −45° or 135° with respect to the first direction X. Thus, in the display apparatus DP according to the embodiment of the present disclosure, each of the liquid crystal particles of the control liquid crystal layer 430 may rotate in a horizontal direction from the lower electrode layer 440 toward the upper electrode layer 450. Therefore, in the display apparatus DP according to the embodiment of the present disclosure, a polarization direction of light passing through the control liquid crystal layer 430 may be changed.

The viewing angle control unit 400 may be disposed between a first control polarizer 510 and a second control polarizer 520. For example, the first control polarizer 510 may be disposed between the back-light unit 100 and the lower substrate 410, and the second control polarizer 520 may be disposed between the upper substrate 420 and the first display polarizer 310. The first control polarizer 510 and the second control polarizer 520 may be a linear polarizer. An absorption axis of the second control polarizer 520 may be perpendicular to an absorption axis of the first control polarizer 510. For example, the absorption axis of the first polarizer 510 may be parallel to the first orientation direction 410r, and the absorption axis of the second control polarizer 520 may be parallel to the second orientation direction 420r.

The viewing angle control unit 400 may be switched to a wide viewing angle mode or a narrow viewing angle mode according to voltage applied to the lower electrode layer 440 and the upper electrode layer 450. In one embodiment, the wide viewing angle mode corresponds to a first viewing angle and the narrow viewing angle mode corresponds to a second viewing angle that is less than the first viewing angle.

Figure 4:
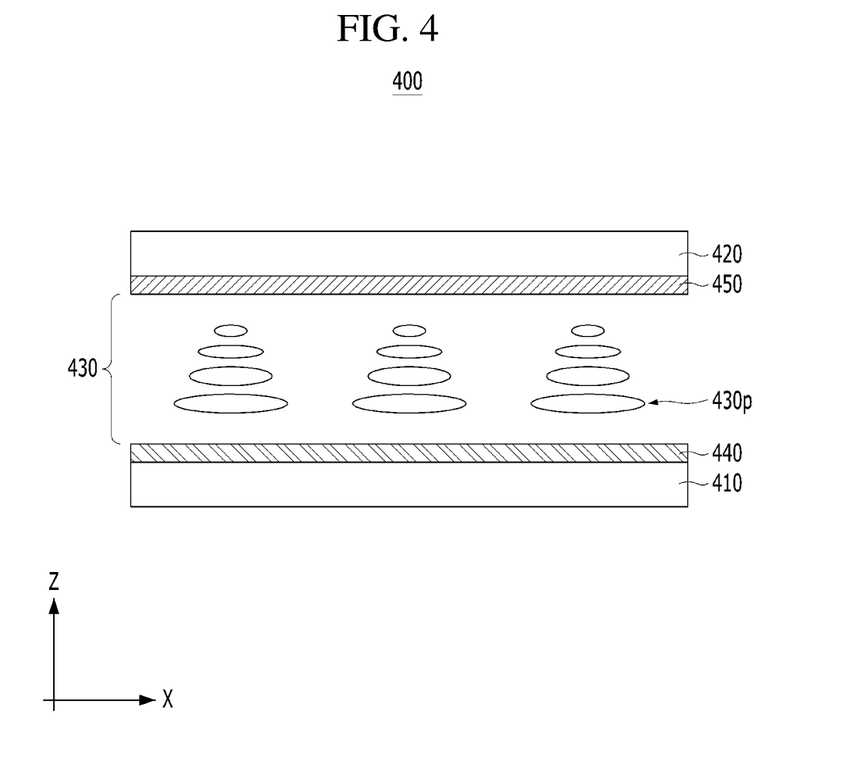
FIG. 4 is a view schematically showing a viewing angle control unit of a wide viewing angle mode in the display apparatus according to the embodiment of the present disclosure.
Figure 5:
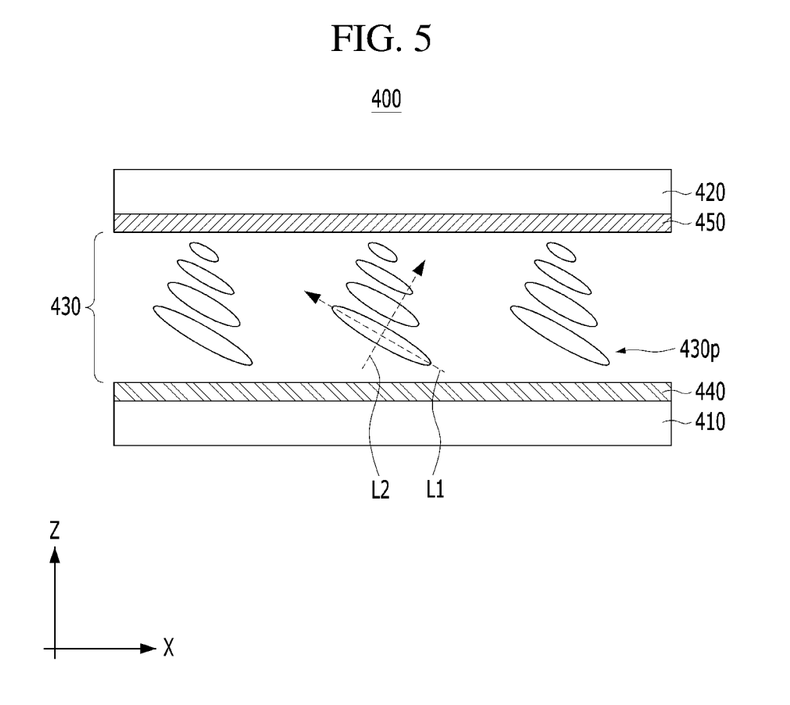
FIG. 5 is a view schematically showing a viewing angle control unit of a narrow viewing angle mode in the display apparatus according to the embodiment of the present disclosure.

FIG. 4 is a view schematically showing a viewing angle control unit of a wide viewing angle mode in the display apparatus according to the embodiment of the present disclosure. FIG. 5 is a view schematically showing a viewing angle control unit of a narrow viewing angle mode in the display apparatus according to the embodiment of the present disclosure.

Referring to FIG. 4, in the display apparatus according to the embodiment of the present disclosure, the control liquid crystal layer 430 of the viewing angle control unit 400 may include the liquid crystal particles 430p arranged parallel to the lower electrode layer 440 and the upper electrode layer 450, in the wide viewing angle mode. For example, a voltage may be not applied to the lower electrode layer 440 and the upper electrode layer 450 of the viewing angle control unit 400, in the wide viewing angle mode. Thus, in the display apparatus according to the embodiment of the present disclosure, light refracted by each liquid crystal particle 430p of the control liquid crystal layer 430 may be uniformly provided in the first direction X and the second direction Y. Therefore, in the display apparatus according to the embodiment of the present disclosure, the image realized using the light passing through the viewing angle control unit 400 of the wide viewing angle mode may be recognized to people around the user, for example, the driver.

Referring to FIG. 5, in the display apparatus according to the embodiment of the present disclosure, the control liquid crystal layer 430 of the viewing angle control unit 400 may include the liquid crystal particles 430p obliquely arranged with respect to the lower electrode layer 440 and the upper electrode layer 450, in the narrow viewing angle mode. For example, a gray level voltage may be applied to the lower electrode layer 440 and the upper electrode layer 450 of the viewing angle control unit 400, in the narrow viewing angle mode. Thus, in the display apparatus according to the embodiment of the present disclosure, light passing through the control liquid crystal layer 430 may include light L1 passing through a major axis of each liquid crystal particle 430p, and light L2 passing through a minor axis of each liquid crystal particle 430p. The light L1 passing through the major axis of each liquid crystal particle 430p may have luminance relatively lower than the light L2 passing through the minor axis of each liquid crystal particle 430p. In the display apparatus according to the embodiment of the present disclosure, the light L1 passing through the major axis of each liquid crystal particle 430p may be provided to a region different from the light L2 passing through the minor axis of each liquid crystal particle 430p. For example, when the central point of the viewing angle control unit 400 where the first orientation direction 410r and the second orientation direction 420r intersect is an origin of the first direction X and the second direction Y, the light L1 passing through the major axis of each liquid crystal particle 430p may be provided on a viewing angle control region Vd overlapping with a second quadrant and a third quadrant of the viewing angle control unit 400, in the narrow viewing angle mode of the display apparatus according to the embodiment of the present disclosure, as shown in FIG. 3. That is, in the display apparatus according to the embodiment of the present disclosure, each of the liquid crystal particles 430p of the control liquid crystal layer 430 may be obliquely arranged with the lower electrode layer 440 and the upper electrode layer 450, such that light having relative low luminance may be provided to the viewing angle control region Vd, in the narrow viewing angle mode.

Referring to FIGS. 1 and 3, the light passing through the viewing angle control region Vd may be provided to the driver seat DS disposed side by side in the first direction X with the passenger seat PS. That is, in the display apparatus DP according to the embodiment of the present disclosure, a viewing angle in the first direction X may be limited, in the narrow viewing angle mode.

Figure 6:
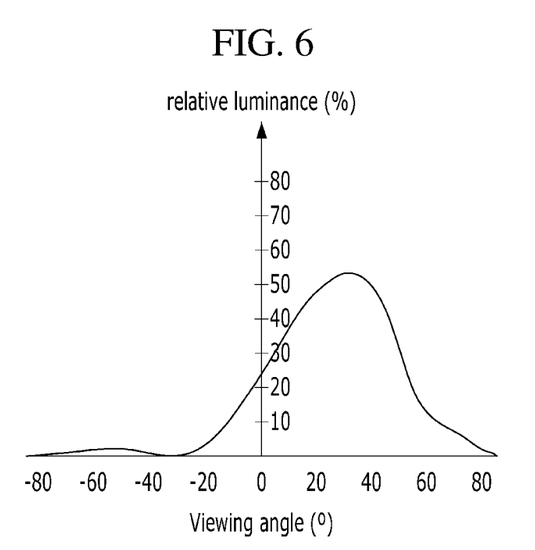
FIG. 6 is a graph showing luminance of light passing through a viewing angle control unit of a narrow viewing angle mode according to viewing angle, in the display apparatus according to the embodiment of the present disclosure.

FIG. 6 is a graph showing luminance of light passing through the viewing angle control unit 400 of a narrow viewing angle mode according to viewing angle, in the display apparatus according to the embodiment of the present disclosure. Herein, the viewing angle means a viewing angle in the first direction X with respect to the central point of the viewing angle control unit 400.

Referring to FIGS. 3 and 6, in the display apparatus according to the embodiment of the present disclosure, luminance of light may be significantly different with respect to the central point of the viewing angle control unit 400, in the narrow viewing angle mode. For example, in the display apparatus according to the embodiment of the present disclosure, the image realized using the light passing through the viewing angle control region Vd may have a significantly low luminance, in the narrow viewing angle mode. Thus, in the display apparatus according to the embodiment of the present disclosure, the image realized in the narrow viewing angle mode may be hardly recognized by people around the user in the first direction X, for example, the driver. Therefore, in the display apparatus according to the embodiment of the present disclosure, gaze dispersion of people (e.g., the driver) around the user (e.g., the passenger) due to the image realized in the narrow viewing angle mode may be prevented thereby reducing a likelihood of an accident.

Accordingly, the display apparatus DP according to the embodiment of the present disclosure may include the viewing angle control unit 400 between the back-light unit 100 and the liquid crystal panel 200, wherein the viewing angle control unit 400 may be switched to the wide viewing angle mode or the narrow viewing angle mode according to voltage applied to the lower electrode layer 440 and the upper electrode layer 450, each of the liquid crystal particles 430p of the control liquid crystal layer 430 may be obliquely arranged with respect to the lower electrode layer 440 and the upper electrode layer 450, in the narrow viewing angle mode. Thus, in the display apparatus DP according to the embodiment of the present disclosure, the image realized in the wide viewing angle mode may be shared with people around the user, and the image realized in the narrow viewing angle mode may be not shared with the people around the user. That is, in the display apparatus DP according to the embodiment of the present disclosure, the realized image may be not recognized the peoples around the user, selectively. Therefore, in the display apparatus DP according to the embodiment of the present disclosure, accidents due to gaze dispersion of the peoples around the user, for example, the driver may be prevented.

It is described that the display apparatus according to the embodiment of the present disclosure is installed in the car. However, the display apparatus according to another embodiment of the present disclosure may be installed in various places. For example, the display apparatus according to another embodiment of the present disclosure may be used in portable electronic devices. Whether or not to share the image realized by the display apparatus according to another embodiment of the present disclosure may be selected by the user. For example, in the display apparatus according to another embodiment of the present disclosure, the image realized while the user is moving may not be recognized by the peoples around the user. Thus, in the display apparatus according to another embodiment of the present disclosure, accidents due to gaze dispersion of peoples around the user while the user is moving may be prevented. And, in the display apparatus according to another embodiment of the present disclosure, the user's privacy may be protected.

Figure 7:
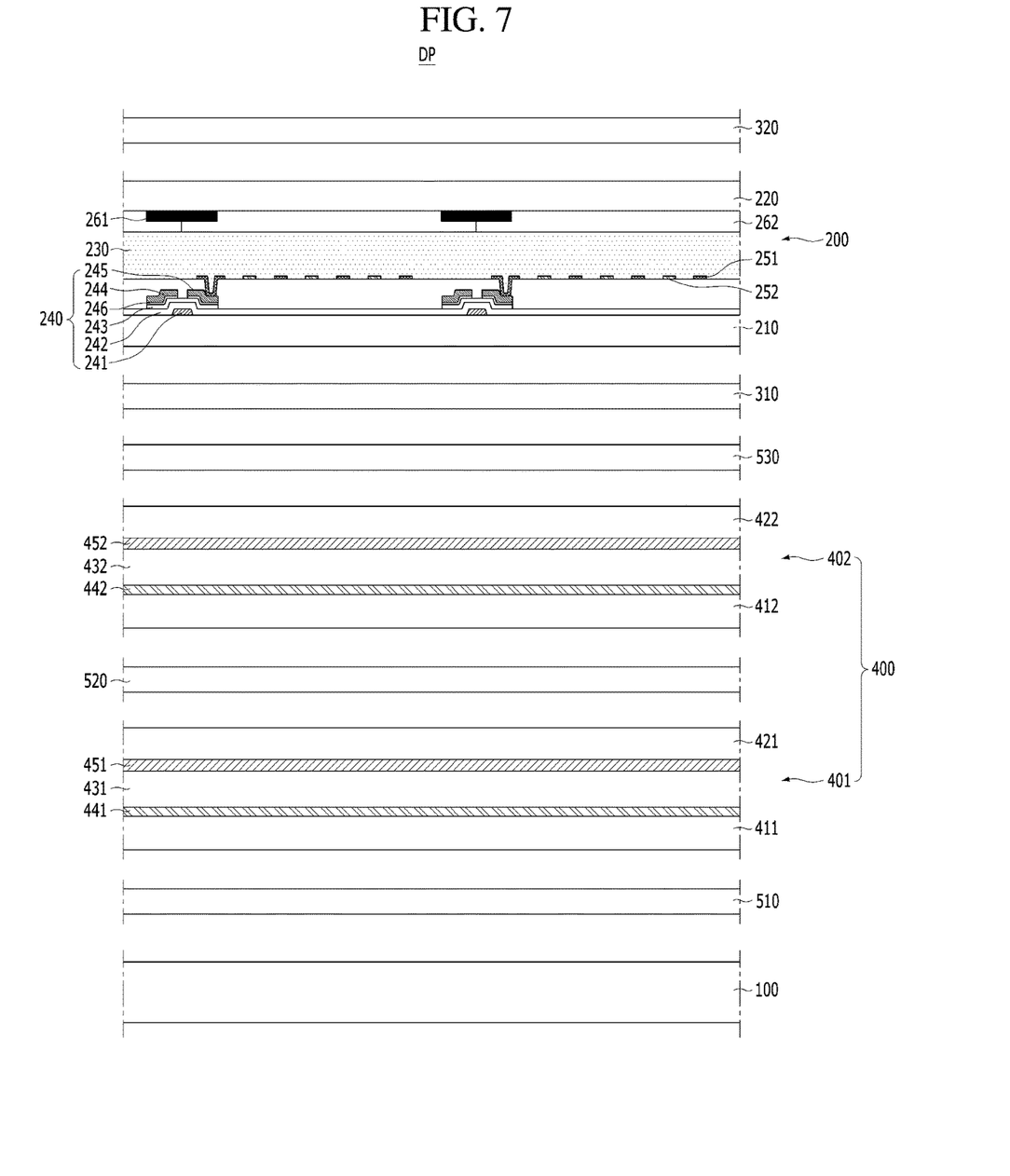
FIG. 7 is a view showing the display apparatus according to another embodiment of the present disclosure.

The display apparatus DP according to the embodiment of the present disclosure is described that a single control liquid crystal layer 430 is disposed between the back-light unit 100 and the liquid crystal panel 200. However, in the display apparatus according to another embodiment of the present disclosure, the viewing angle control unit 400 may include a plurality of control liquid crystal layers 430. For example, in the display apparatus according to another embodiment of the present disclosure, the viewing angle control unit 400 may include a first control unit 401 between the back-light unit 100 and the liquid crystal panel 200, and a second control unit 402 between the first control unit 401 and the liquid crystal panel 200, as shown in FIG. 7.

The first control unit 401 may include a first control liquid crystal layer 431 between a first lower substrate 411 and a first upper substrate 421. A first lower electrode layer 441 may be disposed between the first lower substrate 411 and the first control liquid crystal layer 431 of the first control unit 401, and a first upper electrode layer 451 may be disposed between the first control liquid crystal layer 431 and the first upper substrate 421 of the first control unit 401. Liquid crystal particles of the first control liquid crystal layer 431 may be arranged according to a vertical electric field formed between the first lower electrode layer 441 and the first upper electrode layer 451.

The second control unit 402 may include a second control liquid crystal layer 432 between a second lower substrate 412 and a second upper substrate 422. A second lower electrode layer 442 may be disposed between the second lower substrate 412 and the second control liquid crystal layer 432 of the second control unit 402, and a second upper electrode layer 452 may be disposed between the second control liquid crystal layer 432 and the second upper substrate 422 of the second control unit 402. Liquid crystal particles of the second control liquid crystal layer 432 may be arranged according to a vertical electric field formed between the second lower electrode layer 442 and the second upper electrode layer 452.

Figure 8:
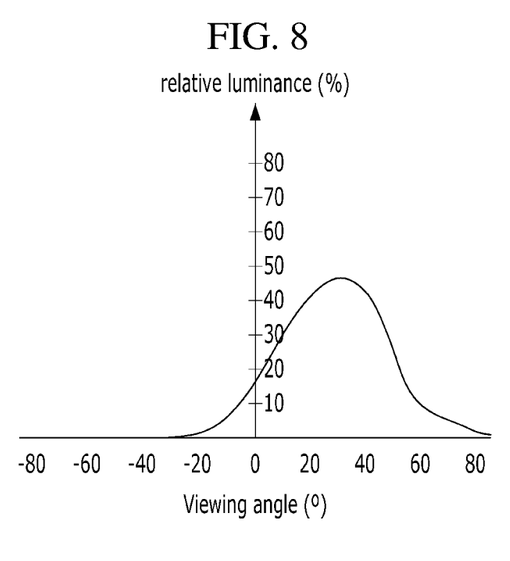
FIG. 8 is a graph showing luminance of light passing through a viewing angle control unit of a narrow viewing angle mode according to viewing angle, in the display apparatus according to another embodiment of the present disclosure.

FIG. 8 is a graph showing luminance of light passing through the viewing angle control unit 400 of a narrow viewing angle mode according to viewing angle, in the display apparatus according to another embodiment of the present disclosure.

Referring to FIGS. 3 and 8, in the display apparatus according to another embodiment of the present disclosure, the image realized using the light passing through the viewing angle control region Vd may be not recognized at all by the people around the user in the first direction X, for example, the driver. Thus, in the display apparatus according to another embodiment of the present disclosure, gaze dispersion of the peoples around the user, for example, the driver due to the image realized in the narrow viewing angle mode may be effectively prevented.

Figure 9:
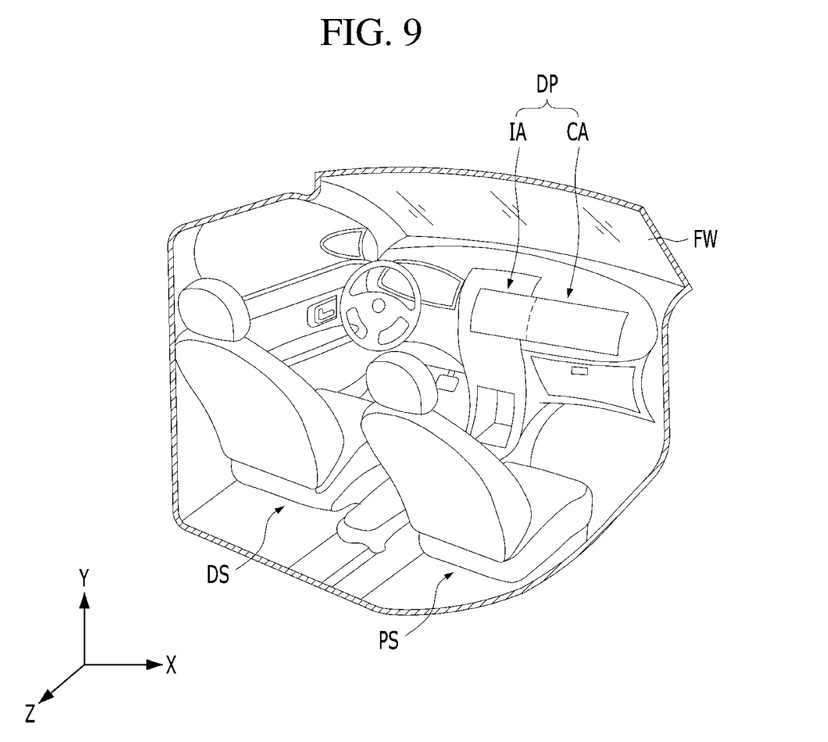
FIGS. 9 and 10 are views showing the display apparatus according to further another embodiment of the present disclosure.
Figure 10:
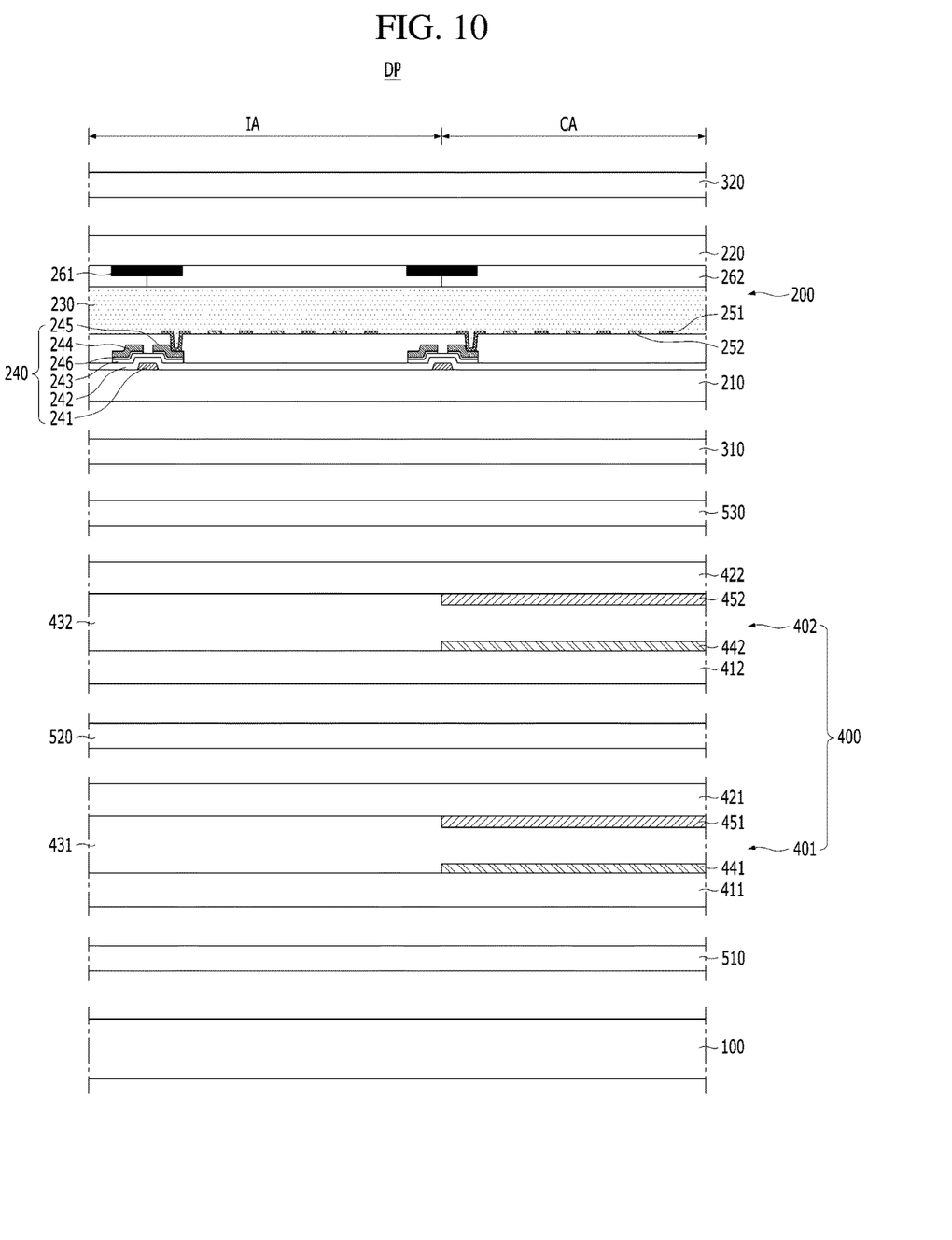

Referring to FIGS. 9 and 10, the display apparatus DP according to another embodiment of the present disclosure may include a first display area IA and a second display area CA, which are disposed side by side in the first direction X. For example, in the display apparatus DP according to another embodiment of the present disclosure, each of the back-light unit 100, the liquid crystal panel 200 and the viewing angle control unit 400 may include a region overlapping with the first display area IA and a region overlapping with the second display area CA. The first display area IA may realize a first image, and the second display area CA may realize a second image different from the first image. For example, the first display area IA may realize the first image including information necessary for driving, and the second display area CA may realize the second image for a person sitting in the passenger seat PS.

The second image may be displayed simultaneously with the first image. The viewing angle control unit 400 between the back-light unit 100 and the liquid crystal panel 200 may have a stacked structure of the first control unit 401 and the second control unit 402. The first control unit 401 may include the first lower electrode layer 441 and the first upper electrode layer 451, which overlap the second display area CA. The second control unit 402 may include the second lower electrode layer 442 and the second upper electrode layer 452, which overlap the second display area CA. The first lower electrode layer 441 and the first upper electrode layer 451 of the first control unit 401, and the second lower electrode layer 442 and the second upper electrode layer 452 of the second control unit 402 may be disposed outside the first display area IA. Thus, in the display apparatus according to another embodiment of the present disclosure, the viewing angle of the second image may be selectively limited. For example, in the display apparatus according to another embodiment of the present disclosure, the second image may be not recognized to the driver sitting in the driver seat DS, selectively. Therefore, in the display apparatus according to another embodiment of the present disclosure, gaze dispersion of the driver due to the second image provided to the user sitting in the passenger seat PS may be prevented, and the information for driving may be provided to the driver sitting the driver seat DS.

In the result, the display apparatus according to the embodiments of the present disclosure may comprise the viewing angle control unit disposed between the back-light unit and the liquid crystal panel, wherein the viewing angle control unit may be switched to a wide viewing angle mode or a narrow viewing angle mode according to voltage applied to the lower electrode and the upper electrode, and each of the liquid crystal particles included in the viewing angle control unit may be obliquely arranged with respect to the lower electrode and the upper electrode. Thus, the image realized by the display apparatus according to the embodiments of the present disclosure may be not recognized to the peoples around the user, selectively. Thereby, in the display apparatus according to the embodiments of the present disclosure, accidents due to gaze dispersion of peoples around the user may be prevented.

What is claimed is:

1. A display apparatus comprising:
a back-light unit;
a viewing angle control unit on the back-light unit, the viewing angle control unit including a first lower electrode, a first control liquid crystal layer on the first lower electrode that includes a plurality of first liquid crystal particles, and a first upper electrode on the first control liquid crystal layer; and
a liquid crystal panel configured to display an image, the liquid crystal panel on the first upper electrode of the viewing angle control unit and including a display liquid crystal layer,
wherein the back-light unit, the viewing angle control unit, and the liquid crystal panel include a region overlapping with a first display area that displays a first image and a region overlapping with a second display area that displays a second image while the first image is displayed, which are disposed side by side,
wherein the first lower electrode and the first upper electrode overlap the second display area without overlapping the first display area,
wherein the viewing angle control unit is configured to switch between a wide viewing angle mode during which the second image is displayed with a same viewing angle as the first image and a narrow viewing angle mode during which the second image is displayed with a viewing angle that is less than a viewing angle of the first image according to a voltage applied to the first lower electrode and the first upper electrode, and
wherein in the narrow viewing angle mode, each of the plurality of first liquid crystal particles of the first control liquid crystal layer is obliquely arranged with respect to the first lower electrode and the first upper electrode.

2. The display apparatus according to claim 1, wherein in the wide viewing angle mode, each of the plurality of first liquid crystal particles of the first control liquid crystal layer is arranged parallel to the first lower electrode and the first upper electrode.

3. The display apparatus according to claim 1, wherein the viewing angle control unit further includes a second control liquid crystal layer including a plurality of second liquid crystal particles, a second lower electrode between the first upper electrode and the second control liquid crystal layer, and a second upper electrode between the second control liquid crystal layer and the liquid crystal panel,
wherein the second lower electrode and the second upper electrode are disposed outside the first display area, and
wherein in the narrow viewing angle mode, each of the plurality of second liquid crystal particles of the second control liquid crystal layer is obliquely arranged with respect to the second lower electrode and the second upper electrode.

4. The display apparatus according to claim 3, wherein the plurality of second liquid crystal particles of the second control liquid crystal layer are parallel to second upper electrode and the second lower electrode in the wide viewing angle mode while the plurality of first liquid crystal particles of the first control liquid crystal layer are parallel to the first upper electrode and the first lower electrode in the wide viewing angle mode.

5. The display apparatus according to claim 3, wherein in the narrow viewing angle mode, each of the plurality of second liquid crystal particles of the second control liquid crystal layer is obliquely arranged in a same direction as each of the plurality of first liquid crystal particles of the first control liquid crystal layer.

6. The display apparatus according to claim 1, wherein the display liquid crystal layer of the liquid crystal panel is between a first display substrate and a second display substrate, and the display liquid crystal layer includes a plurality of liquid crystal particles having a mode that is different from the plurality of first liquid crystal particles of the first control liquid crystal layer.

7. The display apparatus according to claim 1, wherein a first portion of the plurality of first liquid crystal particles of the first control liquid crystal layer are oriented in a first direction on a surface of the first lower electrode, and a second portion of the plurality of first liquid crystal particles of the first control liquid crystal layer are oriented in a second direction perpendicular to the first direction on a surface of the first upper electrode.

8. The display apparatus according to claim 7, further comprising:
- a first control polarizer between the back-light unit and the first lower electrode, the first control polarizer having an absorption axis in the first direction; and
- a second control polarizer between the first upper electrode and the liquid crystal panel, the second control polarizer having an absorption axis in the second direction.

9. The display apparatus according to claim 7, wherein the second display area is adjacent to the first display area in a third direction, and
wherein the third direction is a direction inclined at 45° from the first direction and the second direction.

10. The display apparatus according to claim 9, wherein in the narrow viewing angle mode, a luminance of light provided to the first display area is different from a luminance of light provided to the second display area.

11. The display apparatus according to claim 9, wherein each of the plurality of first liquid crystal particles of the first control liquid crystal layer includes a major axis and a minor axis that is perpendicular to the major axis, and during the narrow viewing angle mode light passing through the major axis of each of the plurality of first liquid crystal particles is provided to the first display area and light passing through the minor axis of each of the plurality of first liquid crystal particles is provided to the second display area.

* * * * *